United States Patent
Vidal (10) Patent No.: US 9,690,562 B2
(45) Date of Patent: Jun. 27, 2017

(54) DETECTING COMPUTING PROCESSES REQUIRING REINITIALIZATION AFTER A SOFTWARE PACKAGE UPDATE

(75) Inventor: Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 791 days.

(21) Appl. No.: 12/714,178

(22) Filed: Feb. 26, 2010

(65) Prior Publication Data
US 2011/0214111 A1 Sep. 1, 2011

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
CPC .. H04L 41/22; G06F 11/1438; G06F 11/1433; G06F 8/65; G06F 8/67; G06F 8/68; G06F 8/60
USPC .......................................................... 717/168
See application file for complete search history.

(56) References Cited

U.S. PATENT DOCUMENTS

| 5,732,275 | A * | 3/1998 | Kullick et al. ................. 717/170 |
|---|---|---|---|
| 7,478,433 | B2 * | 1/2009 | Hashiguchi ..................... 726/26 |
| 2002/0083343 | A1 | 6/2002 | Crosbie et al. |
| 2003/0159070 | A1 | 8/2003 | Mayer et al. |
| 2004/0010786 | A1 * | 1/2004 | Cool et al. ..................... 717/170 |
| 2008/0066069 | A1 * | 3/2008 | Verbowski et al. .......... 718/102 |
| 2008/0148248 | A1 * | 6/2008 | Volkmer et al. .............. 717/168 |
| 2011/0035740 | A1 * | 2/2011 | Powell et al. ................. 717/170 |

OTHER PUBLICATIONS

Seth Kelby Vidal, "System and Methods for Tracking a History of Changes Associated with Software Packages and Configuration Management in a Computing System", U.S. Appl. No. 12/551,523, filed Aug. 31, 2009.
Seth Kelby Vidal, "Systems and Methods for improved Identification and Analysis of Threats to a Computing System", U.S. Appl. No. 12/610,564, filed Nov. 2, 2009.
(Continued)

*Primary Examiner* — Li B Zhen
*Assistant Examiner* — Hui-Wen Lin
(74) *Attorney, Agent, or Firm* — Lowenstein Sandler LLP (57) ABSTRACT

Embodiments relate to systems and methods for detecting computing processes requiring reinitialization after a software package update. A physical or virtual client machine can host a set of installed software packages, including operating system, application, and/or other software. An restart tool can track the set of executing processes on the client, and identify both corresponding executable files which spawned those processes, and any installed package updates which correspond to those executable files. The restart tool can compare the timestamp or other indicator of the version of the executable file which spawned currently running processes, and the timestamp or other indicator of any newer executable files which may have been installed after the application or other process was initiated. A user can be alerted to terminate and restart any processes running off of out-of-date executable files, or in embodiments those reinitializations can be set to be performed automatically.

22 Claims, 4 Drawing Sheets

(56) References Cited

OTHER PUBLICATIONS

Seth Kelby Vidal, "Systems and Methods for Utilizing a History of Changes Associated with Software Packages and Configuration Management to Manage Multiple Computing Systems", U.S. Appl. No. 12/610,610, filed Nov. 2, 2009.

Seth Kelby Vidal, "Systems and Methods for Generating a Version Identifier for a Computing System Based on Software Packages Installed on the Computing System", U.S. Appl. No. 12/827,744, filed Nov. 30, 2009.

Seth Kelby Vidal, "Systems and Methods for Managing a Network of Computer System Using a Version Identifier Generated Based on Software Packages Installed on the Computing Systems", U.S. Appl. No. 12/627,989, filed Nov. 30, 2009.

Seth Kelby Vidal, "Systems and Methods for Generating Machine State Verification Using Number of Installed Package Objects", U.S. Appl. No. 12/787,164, filed May 25, 2010.

Seth Kelby Vidal, "Systems and Methods for Generating Encoded Identifications of Selected Subsets of Installed Software Packages on a Client Machine", U.S. Appl. No. 12/768,330, filed Apr. 27, 2010.

Seth Kelby Vidal, "Systems and Methods for Determining Compatibility of a Software Package Update Using a Version Identifier", U.S. Appl. No. 12/713,271, filed Feb. 26, 2010.

Seth Kelby Vidal, "Systems and Methods for Tracking a History of Changes Associated with Software Packages in a Computing System", U.S. Appl. No. 12/551,475, filed Aug. 31, 2009.

* cited by examiner

DETECTING COMPUTING PROCESSES REQUIRING REINITIALIZATION AFTER A SOFTWARE PACKAGE UPDATE

FIELD

The present teachings relate to systems and methods for detecting computing processes requiring reinitialization after a software package update, and more particularly to platforms and techniques for scanning executing processes on a physical or virtual machine to identify processes whose executable files have become outdated due to an intervening software package update.

BACKGROUND OF RELATED ART

A computer user of a physical or virtual machine typically starts and runs a number of applications or other software in the course of operating that machine. Some users may leave the machine and its set of applications in a running or active state for hours or days, depending on the tasks they are engaged in, the type of data being processed, and other factors. In the various intervals of operation, updates to software packages on the machine may be performed. For example, a set of applications related to an engineering project and its associated database may be updated via a package update mechanism. In a package update, operating system, application, utility, and/or other related or associated software components may be updated in an integrated package update process, which can involve one download file or a number of download files. Users may choose to initiate package updates at different times during use of their system, or at times, package updates can be performed on an automatic and/or triggered basis.

When package updates are performed, the executable files from which running processes on the machine were launched may in fact become outdated, since the processes may now be executing using code that is no longer part of or reflected in the most recent package version installed on the machine. To ensure the most reliable or up-to-date operation of the machine, the user may wish to terminate all executing processes whose underlying executable files have become out-of-date. However, using existing operating systems and other platforms, there is no logic or utility that permits the checking of executing processes against their source packages, to determine which processes and/or applications need to be terminated and restarted, in order to take advantage of any intervening installed package updates. It may be desirable to provide systems and methods for detecting computing processes requiring reinitialization after a software package update, to permit a user to refresh the collection of executable files and executing processes in an efficient and complete manner.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for for detecting computing processes requiring reinitialization after a software package update. More particularly, embodiments related to platforms and techniques for monitoring and managing the suite of installed packages that may be hosted on a physical or virtual client machine. In aspects, a restart tool and/or other logic can perform and/or assist in performing update management on those packages and their associated executable files and running processes. In aspects, the restart tool and/or other logic can associate currently executing applications, services, threads, and/or other processes on a client or target machine with the executable files contained in a software package update. The restart tool and/or other logic can then compare the datestamp or other version indicator of the software package update and/or its associated files with a start time of the currently executing processes to identify those processes which may be operating based on outdated executable files or package versions. The executing processes can then be managed to terminate, update, restart, and/or perform other actions on those entities. These and other embodiments described herein address the various noted shortcomings in known package update technology, and provide a user with enhanced version control over their installed software package resources.

Reference will now be made in detail to exemplary embodiments of the present teachings, which are illustrated in the accompanying drawings. Where possible the same reference numbers will be used throughout the drawings to refer to the same or like parts.

Figure 1:
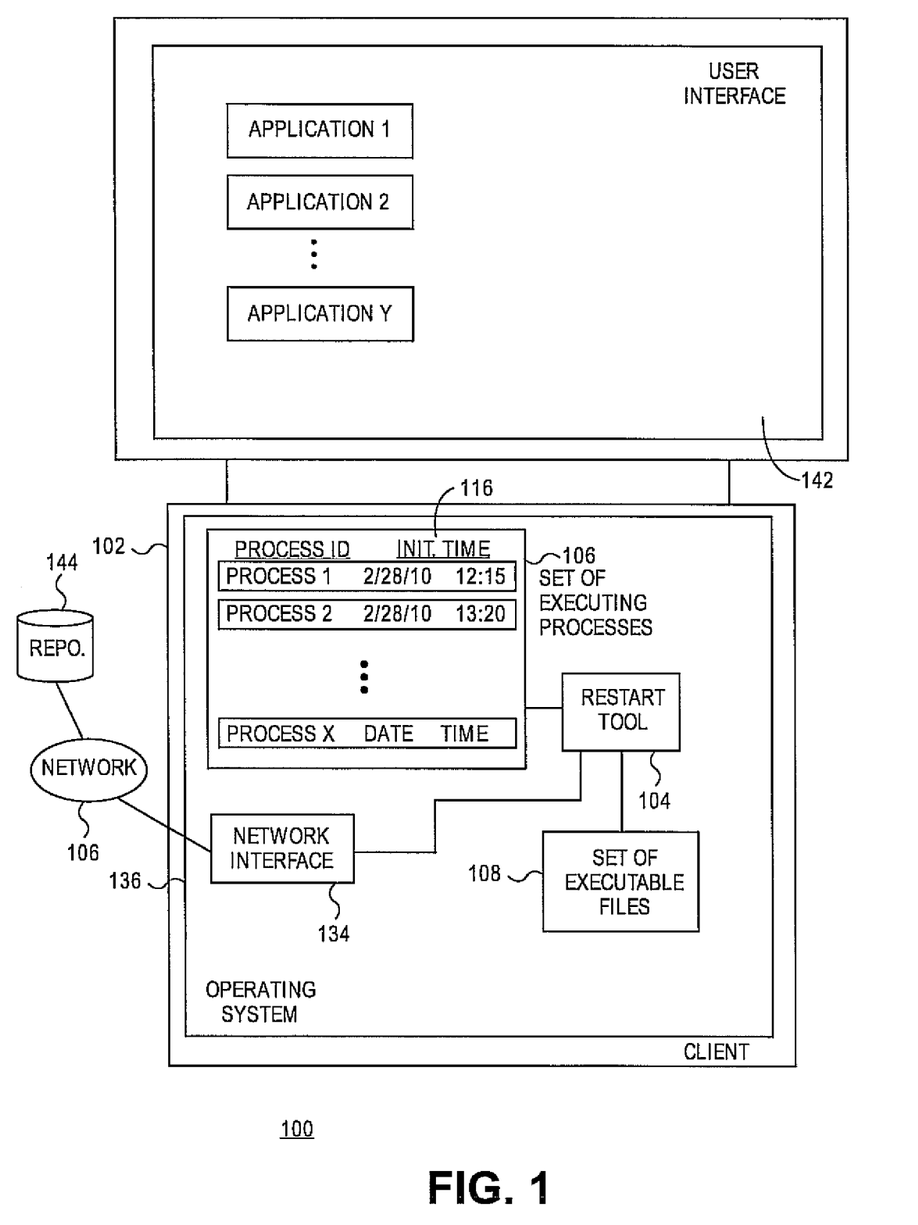
FIG. 1 illustrates an overall network in which for systems and methods for detecting computing processes requiring reinitialization after a software package update can be implemented, according to various embodiments.

FIG. 1 illustrates an exemplary system 100 in which systems and methods for detecting computing processes requiring reinitialization after a software package update can be implemented, according to various embodiments. In embodiments as shown, a client 102 can store, execute, and otherwise host a variety of resources including a restart tool 104 configured to communicate with a set of executing processes 106, and/or other software and resources. In embodiments, restart tool 104 can be or include a software application, a utility, an application programming interface (API) to an operating system 136 of client 102, a service, or other local or remote logic or resources. According to embodiments, in general restart tool 104 can monitor set of executing processes 116 to identify those processes which may have been spawned or initiated from or by executable files which have become out of date or obsolete, due to intervening downloads to client 102 or other events. In aspects, restart tool 104 and associated logic can be implemented as a software daemon, or other resource in client 102.

Set of executing processes 106 can comprise executable applications, threads, services, utilities, and/or other computing processes being executed or carried out on client 102. In aspects, set of executing processes 106 can be accessed via an operating system 136 of client 102, or other resources. According to aspects, each executing process in set of executing processes 106 can be associated with an executable file located in a set of executable files 108 hosted or stored on or via client 102. For example, set of executable files can be stored in an ".exe" or other file format, and/or registered in a registry of operating system 136 of client 102. In aspects, each running or executing process in set of executing processes 106 can be associated with one or more executable file in set of executable files 108. In aspects, an executing process can be launched directly from an executable file, and associated with that file. In aspects, an executing process can be associated with, and communicate with, one or more other processes (and/or related source files) with which data is exchanged, for instance, through communications ports, pipes, or other mechanisms. According to various embodiments, restart tool 104 can detect and identify the executable files associated with processes in set of executing processes 106, as part of discovery activity directed at locating processes running based on out-of-date source files linked with software package updates.

Figure 2:
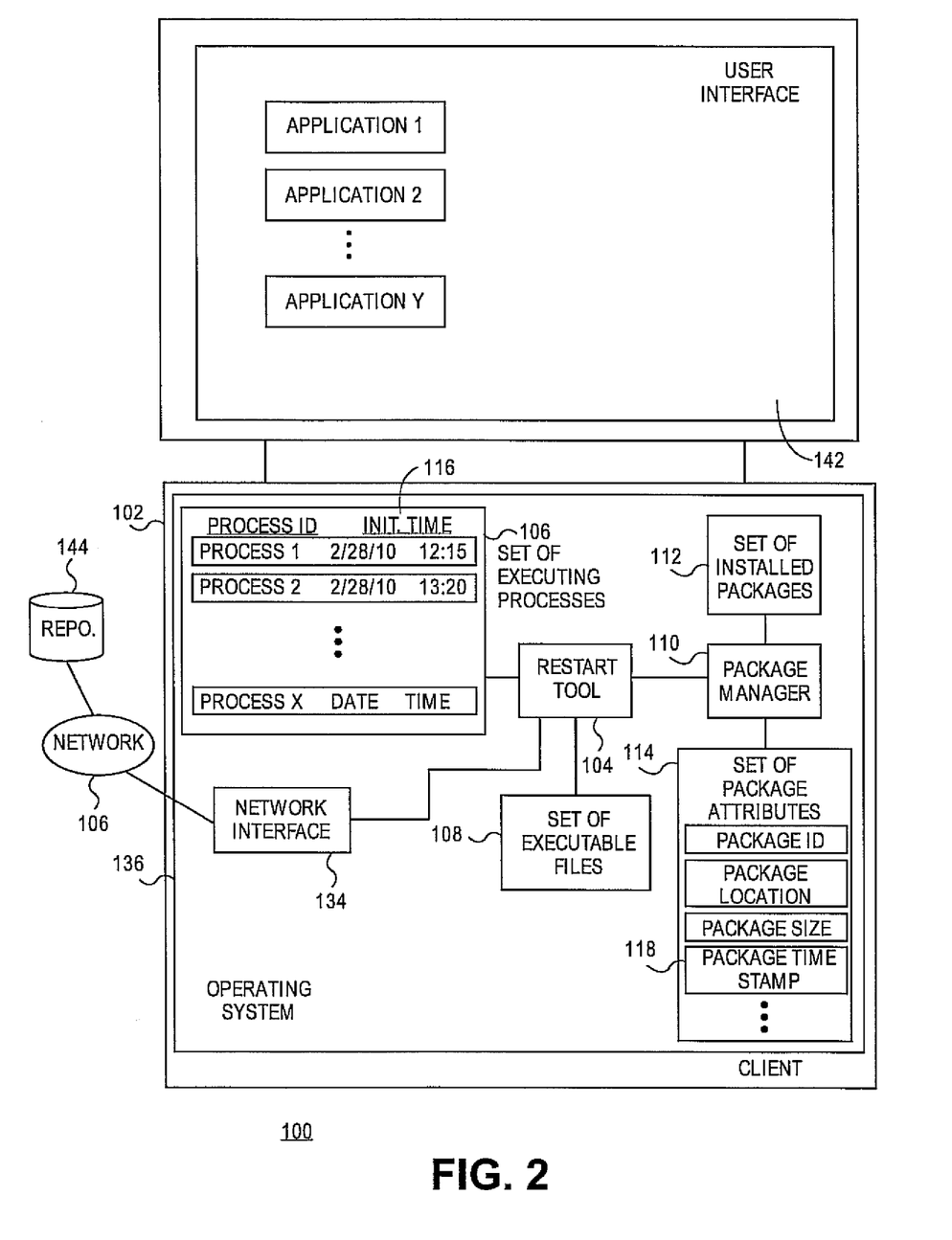
FIG. 2 illustrates an overall network in which for systems and methods for detecting computing processes requiring reinitialization after a software package update can be implemented, according to various embodiments in further regards.

More particularly, and as for instance shown in FIG. 2, client 102 can host a package manager 110, along with associated records of the software packages installed on client 102, including set of installed software packages 112. Restart tool 104 can communicate with package manager 110 to identify any one or more software package updates stored in set of installed software packages 112 from which a given executable file in set of executable files 108 has been obtained or installed. Set of installed software packages 112 can have an associated set of package attributes 114 which records file names, versions, dates, software requirements, an/or other attributes related to the software package updates installed on client 102 and reflected in set of installed software packages 112.

In aspects, restart tool 104 can identify one or more executable files corresponding to the executing processes in set of executing processes 106. Restart tool 104 can then identify any one or more software package updates in set of installed software packages 112 corresponding to those executable files, for instance, by communicating with package manager 110 and/or other resources.

Upon identification of the software package updates corresponding to the processes that are executing on client 102, restart tool 104 can perform an analysis of the currency of the executing processes to determine which processes may need to be terminated and/or restarted to take advantage of intervening package updates. In aspects, restart tool 104 can compare a processes start time 116 for each executing process in set of executing processes 106 to a time stamp 118 and/or other version or date indicator in set of package attributes 118. In aspects, restart tool 104 can for instance determine that the start time 116 for a given process, such as an application "MessengerApplication1", is before the time stamp 118 for a software package update containing an executable file corresponding to that application. In that event, restart tool 104 can identify the "MessengerApplication1" process as being obsolete, out-of-date, and/or otherwise requiring termination or suspension. Restart tool 104 can instruct operating system 136 to terminate such a process or any other process whose start time 116 is before the time stamp 118 or other version or date indicator for the corresponding package update, since that process has been spawned or instantiated based on a package and its executable file(s) which have been superseded and/or otherwise rendered out of day.

In aspects, any one or more processes which have been identified as out-of-date can be notified to the user for potential termination, for example, via a graphical user interface such as a selector gadget, to permit the user to choose to terminate, or to continue to execute, any out-of-date processes. In aspects, out-of-date processes can in addition or instead be automatically terminated by restart tool 104, for instance by calls to operating system 136. In aspects, the user can be provided with a selector option to restart or re-initiate the terminated process with a newer version of that process, using more recent executable file(s) located in or installed via set of installed packages 112. In aspects, restart tool 104 can be configured to automatically restart or re-initiate any terminated processes using the more recent executable file(s). According to aspects in further regards, restart tool 104 can also detect, notify, and/or restart any processes associated with executable files which have been deleted from client 102. Executable files on client 102 can be deleted or removed, for example, as a result of user deletion, corruption, the execution of anti-virus applications, or other activity.

Figure 3:
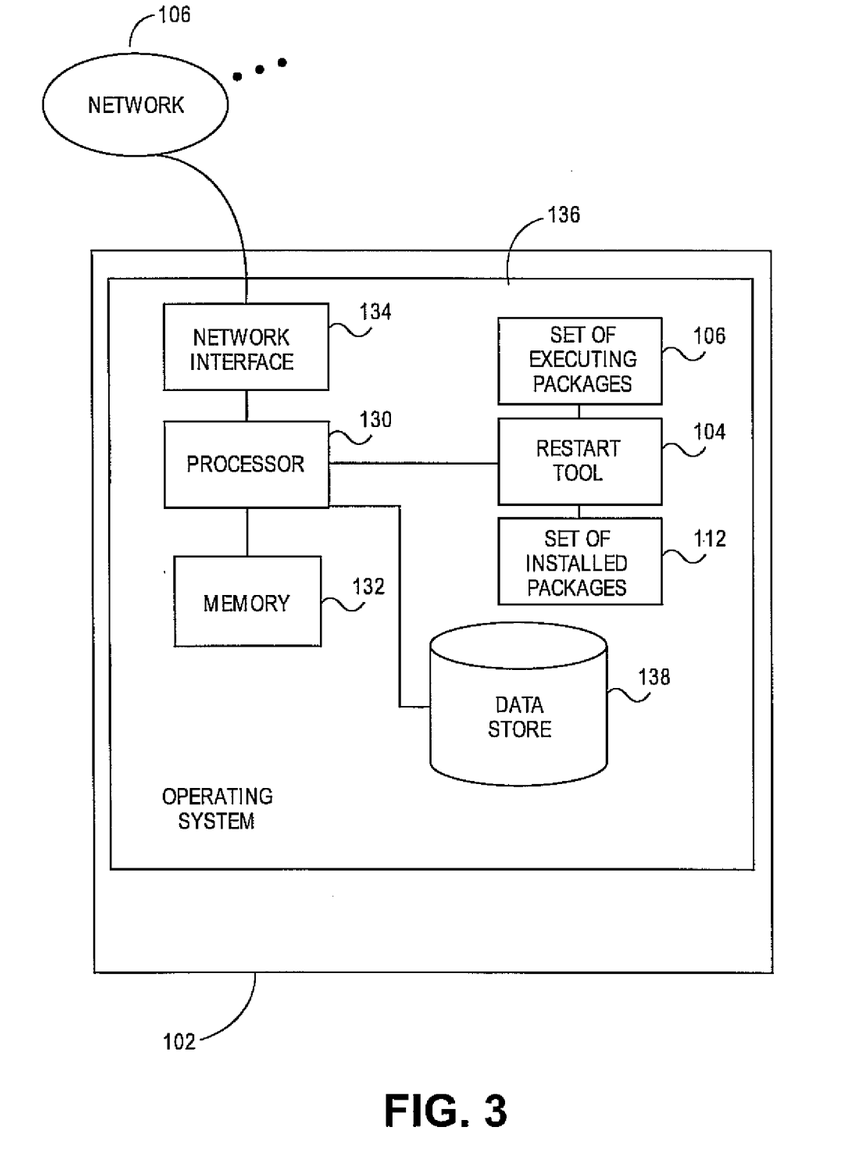
FIG. 3 illustrates exemplary hardware and other resources of a client machine that can be used in systems and methods for detecting computing processes requiring reinitialization after a software package update, according to various embodiments.

FIG. 3 illustrates an exemplary diagram of hardware and other resources that can be incorporated in a client 102 configured to manage a set of installed packages 112, set of executing processes 106, and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with restart tool 104 to execute control logic and control the updating, installation, and management of software packages and their associated processes. Other configurations of client 102, including processor and memory resources, associated network connections, and other hardware and software resources are possible.

Figure 4:
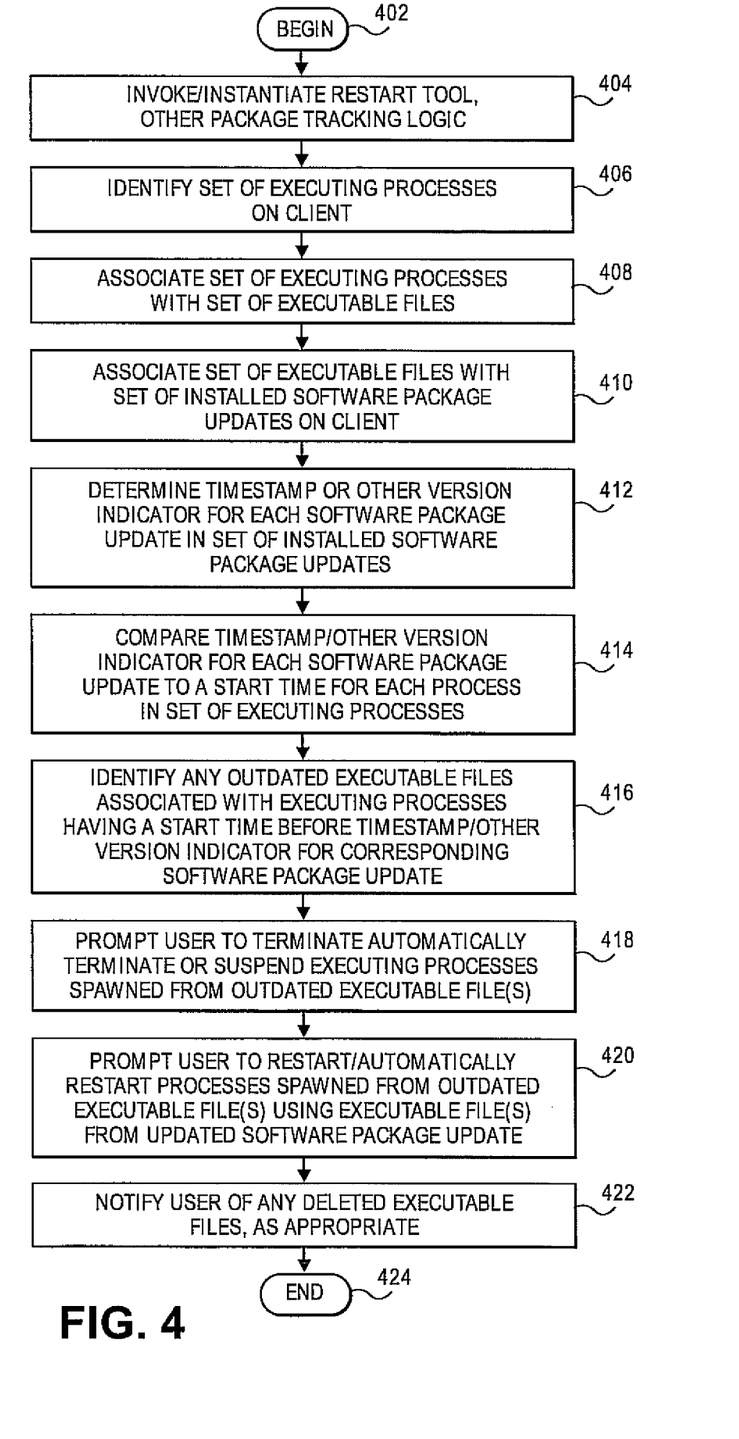
FIG. 4 illustrates a flowchart of software package update detection and processing that can be used in systems and methods for detecting computing processes requiring reinitialization after a software package update, according to various embodiments.

FIG. 4 illustrates overall processing to track, monitor, and manage software package updates and associated executable files, running processes, and related resources. In 402, processing can begin. In 404, a user can invoke or instantiate restart tool 104 on client 102 to perform software package update maintenance and management. In 406, restart tool 104 and/or other logic can identify a set of executing processes 106 that are running on client 102, for instance, by calling an application programming interface (API) of an operating system of client 102 to enumerate executing applications, services, threads, and/or other processes. In 408, restart tool 104 and/or other logic can associate processes in set of executing processes 106 with corresponding files in set of executable files 108 which spawned those respective processes.

In 410, restart tool 104 and/or other logic can associate each file in the set of executable files 108 with a corresponding software package update in set of installed software packages 112 installed on client 102. In aspects, for instance, an executable file for a file named "WordProcessing.exe" or other word processing, messaging, or other application can be associated with a software package update containing the same executable file, identified by file name or other identifier. In 412, restart tool 104 and/or other logic can determine a times tamp 118 and/or other version indicator for each software package update in set of installed software packages 112. For instance, a software package update labeled "Package A" can have an associated time stamp 118 of "Jan. 31 2010" indicating that package was generated, posted, downloaded, and/or installed on the indicated date. Other version identifiers can be used. For instance, in embodiments, a version number, such as "Version 3.2", can be used. In aspects, a version identifier such as "Version 3.2" can be used to look up a time stamp 118 or other date indicator for the software package, for instance, via a product registry on a corporate site, or other database or resource.

In 414, restart tool 104 and/or other logic can compare the time stamp 118 and/or other version indicator for each software package update in set of installed software packages 112 to a process start time 116 for each corresponding process in set of executing processes 106. In aspects, for instance, the start time of an executing application running under the process name "WordProcessing" can be compared to the time stamp 118 for the software package update containing an executable file corresponding to that process. In 416, restart tool 104 can identify any outdated executable files associated with executing processes having a start time 116 before time stamp 118 and/or the date of any other version indicator for the corresponding software package update in set of installed software packages 112. In 418, restart tool 104 and/or other logic can prompt the user to terminate or suspend, and/or in embodiments, restart tool 104 can automatically terminate or suspend, the executing processes in set of executing processes 106 which were spawned or instantiated from outdated executable file(s). In 420, restart tool 104 and/or other logic can prompt the user to restart, and/or in embodiments, restart tool 104 can automatically restart, any one or more processes that were spawned or instantiated from outdated executable file(s), from a more recent executable file extracted from a newly or more recently installed software package update. In aspects, for example, restart tool 104 can automatically initiate, and/or the user can be prompted to initiate, an executable file named "WordProcessing.exe" with "Version 3.3," after an obsolete version is terminated. In 422, restart tool 104 and/or other logic can notify the user of any deleted, missing, or corrupt executable files identified in the software package maintenance and management process, for instance, to permit downloading replacement files, or to take other action. In 424, processing can return to a prior processing point, jump to a further processing point, or end.

The foregoing description is illustrative, and variations in configuration and implementation may occur to persons skilled in the art. For example, while embodiments have been described in which the currency of an executing process is determined or identified by tracing the time stamp or other version indicator related to software package updates, in embodiments, individual software applications rather than packages can be analyzed. For further example, while embodiments have been described in which restart tool 104 is hosted on client 102, in embodiments, restart tool 104 and/or associated logic can be hosted or located at remote locations, such as on Web sites providing software package management and related services. In embodiments where a remote restart tool 104 and/or associated services and logic are provided, multiple physical or virtual clients or other machines can be managed at the same time, as a group, or in conjunction with each other. For example, a network management platform can be used to check and restart executing processes on a set of managed machines hosted on a network. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   associating, by a processor, a plurality of executing processes on a client with an executable file;
   associating, by the processor, the executable file with a software package update, wherein the software package update comprises a first executable file corresponding to the plurality of executing processes;
   determining an update timestamp for the software package update;
   comparing, by the processor, the update timestamp and a version for the software package update to a start time for each executing process in the plurality of executing processes and to a version of the executable file;
   identifying, by the processor, an outdated executing process in the plurality of executing processes having a start time before the update timestamp of the associated software package update and having the version of the executable file before the version for the software package update in view of the comparison;
   providing, by the processor, a prompt to allow a selection of whether to suspend execution or continue execution of the outdated executing process in the plurality of executing processes associated with the executable file;
   responsive to detecting the selection to suspend execution of the outdated executing process, deleting, by the processor, the executable file from the client;
   responsive to the deleting of the executable file, allowing, by the processor, selection of restarting of an executing process in the plurality of executing processes associated with the deleted executable file;
   responsive to the selection of restarting of the executing process, restarting, by the processor, the executing process in the plurality of executing processes associated with the deleted executable file using the first executable file in the software package update;
   monitoring the plurality of executing processes to identify a spawned process associated with the outdated executing process that is suspended; and
   restarting the spawned process at a processing point corresponding to the suspended execution of the outdated executing process, wherein restarting the spawned process comprises jumping an execution of the spawned process to a second processing point that is further than the processing point associated with the suspended execution.

2. The method of claim 1, further comprising receiving user input to select the outdated executing process to terminate.

3. The method of claim 2 further comprising terminating the outdated executing process in response to the user input.

4. The method of claim 3 further comprising allowing the user to select a restart of the terminated process.

5. The method of claim 4 further comprising restarting the terminated process using a second executable file from the software package update, wherein the second executable file is an updated version of the executable file, wherein the updated version is different from the version.

6. The method of claim 1, further comprising receiving user input to select the outdated executing process to continue execution.

7. The method of claim 6 further comprising continuing execution of the outdated executing process in response to the user input.

8. The method of claim 1, wherein the client comprises one of a virtual machine or a physical machine.

9. The method of claim 1, further comprising initiating a restart tool on the client.

10. The method of claim 1, further comprising identifying process in the plurality of executing processes for which a corresponding executable file has been deleted from the client.

11. The method of claim 1, wherein the executing process is restarted at a second processing point subsequent to the processing point associated with the outdated executing process previously suspended.

12. A system comprising:
   a memory; and
   a processor, operatively coupled to the memory, to:
      associate a plurality of executing processes on a client with an executable file, wherein the software package update comprises a first executable file corresponding to the plurality of executing processes;
      associate the executable file with a software package update;
      determine an update timestamp for the software package update;
      compare the update timestamp and a version for the software package update to a start time for each executing process in the plurality of executing processes and to a version of the executable file;
      identify an outdated executing process in the plurality of executing process having a start time before the update timestamp of the associated software package update and having the version of the executable file before the version for the software package update in view the comparison;
      provide a prompt to allow a selection of whether to suspend execution or continue execution of the outdated executing process in the plurality of executing processes associated with the executable file;
      responsive to detecting the selection to suspend execution of the outdated executing process, delete the executable file from the client;
      responsive to the delete of the executable file, allow selection of a restart of an executing process in the plurality of executing processes associated with the deleted executable file;
      responsive to the selection of restart of the executing process, restart the executing process in the plurality of executing process associated with the deleted executable file using the first executable file in the software package update;
      monitor the plurality of executing processes to identify a spawned process associated with the outdated executing process that is suspended; and
      restart the spawned process at a processing point corresponding to the suspended execution of the outdated executing process, wherein to restart the spawned process comprises jumping an execution of the spawned process to a second processing point that is further than the processing point associated with the suspended execution.

13. The system of claim 12, the processor further to receive user input to select the outdated executing process to terminate.

14. The system of claim 13, the processor further to receive user input to select the outdated executing process to continue execution.

15. The system of claim 14, the processor further to continue execution of the outdated executing process in response to the user input.

16. The system of claim 13, the processor further to terminate the outdated executing process in response to the user input.

17. The system of claim 16, the processor further to allow the user to select a restart of the terminated process.

18. The system of claim 17, the processor further to restart the terminated process using a second executable file from the software package update, wherein the second executable file is an updated version of the executable file, wherein the updated version is different from the version.

19. The system of claim 12, wherein the client comprises of a virtual machine or a physical machine.

20. The system of claim 12, the processor further to initiate a restart tool on the client.

21. The system of claim 12, the processor further to identify a process in the plurality of executing processes for which a corresponding executable file has been deleted from the client.

22. A non-transitory computer readable storage medium comprising executable instructions, that when executed by a processor, cause the processor to:
   associate, by the processor, a plurality of executing processes on a client with an executable file, wherein the software package update comprises a first executable file corresponding to the plurality of executing processes;
   associate the executable file with a software package update;
   determine an update timestamp for the software package update;
   compare the update timestamp and a version for the software package update to a start time for each executing process in the plurality of executing processes and to a version of the executable file;
   identify an outdated executing process in the plurality of executing process having a start time before the update timestamp of the associated software package update and having the version of the executable file before the version for the software package update in view the comparison;
   provide a prompt to allow a selection of whether to suspend execution or continue execution of the outdated executing process in the plurality of executing processes associated with the executable file;
   responsive to detecting the selection to suspend execution of the outdated executing process, delete the executable file from the client;
   responsive to the delete of the executable file, allow selection of a restart of an executing process in the plurality of executing processes associated with the deleted executable file;
   responsive to the selection of restart of the executing process, restart the executing process in the plurality of executing process associated with the deleted executable file using the first executable file in the software package update;

monitor the plurality of executing processes to identify a spawned process associated with the outdated executing process that is suspended; and restart the spawned process at a processing point corresponding to the suspend execution of the outdated executing process, wherein to restart the spawned process comprises jumping an execution of the spawned process to a second processing point that is further than the processing point associated with the suspended execution.

* * * * *